(12) United States Patent
Diehl et al.

(10) Patent No.: US 9,798,882 B2
(45) Date of Patent: Oct. 24, 2017

(54) REAL-TIME MODEL OF STATES OF MONITORED DEVICES

(71) Applicant: CrowdStrike, Inc., Irvine, CA (US)

(72) Inventors: David Frederick Diehl, Minneapolis, MN (US); Leif Air Fire Grosch Jackson, Marietta, GA (US); James Robert Plush, Lake Forest, CA (US)

(73) Assignee: CrowdStrike, Inc., Irvine, CA (US)

( * ) Notice: Subject to any disclaimer, the term of this patent is extended or adjusted under 35 U.S.C. 154(b) by 0 days.

(21) Appl. No.: 14/297,974

(22) Filed: Jun. 6, 2014

(65) Prior Publication Data
US 2015/0356301 A1 Dec. 10, 2015

(51) Int. Cl.
*G06F 21/55* (2013.01)
*G06F 21/57* (2013.01)

(52) U.S. Cl.
CPC .......... *G06F 21/577* (2013.01); *G06F 21/552* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,088,804 A | 7/2000 | Hill et al. | |
| 7,478,237 B2 | 1/2009 | Costea et al. | |
| 7,765,400 B2 | 7/2010 | Costea et al. | |
| 7,765,410 B2 | 7/2010 | Costea et al. | |
| 8,065,728 B2 | 11/2011 | Wang et al. | |
| 8,234,693 B2 | 7/2012 | Stahl et al. | |
| 8,321,677 B2 | 11/2012 | Morten | |
| 8,407,279 B2 | 3/2013 | Kang | |
| 8,572,247 B2 | 10/2013 | Larson et al. | |
| 8,577,616 B2 | 11/2013 | Dunlap | |

(Continued)

FOREIGN PATENT DOCUMENTS

| | | |
|---|---|---|
| KR | 1020100085424 A | 7/2010 |
| KR | 101038048 | 6/2011 |

(Continued)

OTHER PUBLICATIONS

Final Office Action for U.S. Appl. No. 13/492,672, dated Oct. 23, 2014, David F. Diehl, "Kernel-Level Security Agent", 15 pages.

(Continued)

*Primary Examiner* — Malcolm Cribbs
(74) *Attorney, Agent, or Firm* — Lee & Hayes, PLLC (57) ABSTRACT

A model representing system components and events of a plurality of monitored devices as data objects is described herein. The model resides on a security service cloud and is updated in substantially real-time, as security-relevant information about the system components and events is received by the security service cloud. Each data object in the model has a scope and different actions are taken by security service cloud modules depending on different data object scopes. Further, the security service cloud maintains a model specific to each monitored device built in substantially real-time as the security-relevant information from that device is received. The security service cloud utilizes these device-specific models to detect security concerns and respond to those concerns in substantially real-time.

24 Claims, 8 Drawing Sheets

(56) References Cited

U.S. PATENT DOCUMENTS

| | | | |
|---|---|---|---|
| 8,762,298 | B1 | 6/2014 | Ranjan et al. |
| 8,881,288 | B1* | 11/2014 | Levy et al. ............ 726/25 |
| 2002/0123966 | A1* | 9/2002 | Chu et al. ............ 705/43 |
| 2003/0084009 | A1* | 5/2003 | Bigus ............ G06F 11/2257 706/6 |
| 2003/0097588 | A1* | 5/2003 | Fischman et al. ............ 713/200 |
| 2004/0049698 | A1* | 3/2004 | Ott et al. ............ 713/201 |
| 2004/0230834 | A1* | 11/2004 | McCallam ............ H04L 12/2602 726/23 |
| 2005/0138110 | A1 | 6/2005 | Redlich et al. |
| 2006/0174323 | A1 | 8/2006 | Brown et al. |
| 2006/0272024 | A1* | 11/2006 | Huang ............ G06F 21/55 726/26 |
| 2007/0022287 | A1 | 1/2007 | Beck et al. |
| 2007/0028291 | A1 | 2/2007 | Brennan et al. |
| 2007/0039047 | A1* | 2/2007 | Chen et al. ............ 726/22 |
| 2007/0094496 | A1 | 4/2007 | Burtscher |
| 2007/0143850 | A1* | 6/2007 | Kraemer et al. ............ 726/25 |
| 2007/0174569 | A1 | 7/2007 | Schnapp et al. |
| 2007/0250817 | A1 | 10/2007 | Boney |
| 2007/0261120 | A1 | 11/2007 | Arbaugh et al. |
| 2008/0034429 | A1 | 2/2008 | Schneider |
| 2008/0148398 | A1* | 6/2008 | Mezack et al. ............ 726/22 |
| 2008/0189796 | A1 | 8/2008 | Linn et al. |
| 2008/0209505 | A1 | 8/2008 | Ghai et al. |
| 2008/0253287 | A1 | 10/2008 | Gupta et al. |
| 2008/0282198 | A1 | 11/2008 | Brooks et al. |
| 2008/0320561 | A1* | 12/2008 | Suit ............ H04L 63/126 726/3 |
| 2009/0199296 | A1 | 8/2009 | Xie et al. |
| 2009/0216806 | A1 | 8/2009 | Feuerstein et al. |
| 2009/0300769 | A1* | 12/2009 | Srinivasa et al. ............ 726/26 |
| 2009/0328193 | A1* | 12/2009 | Moore et al. ............ 726/15 |
| 2010/0031354 | A1 | 2/2010 | Hudis et al. |
| 2010/0074446 | A1 | 3/2010 | Fuchs et al. |
| 2010/0095374 | A1* | 4/2010 | Gillum et al. ............ 726/22 |
| 2010/0100619 | A1* | 4/2010 | Chang et al. ............ 709/224 |
| 2010/0169973 | A1 | 7/2010 | Kim et al. |
| 2010/0235622 | A1 | 9/2010 | Robinton et al. |
| 2010/0312890 | A1 | 12/2010 | Bernosky |
| 2011/0029772 | A1 | 2/2011 | Fanton et al. |
| 2011/0039237 | A1* | 2/2011 | Skare ............ 434/118 |
| 2011/0072012 | A1* | 3/2011 | Ah-Pine et al. ............ 707/725 |
| 2011/0099632 | A1 | 4/2011 | Beck et al. |
| 2011/0138469 | A1* | 6/2011 | Ye ............ G06F 21/577 726/25 |
| 2011/0209219 | A1 | 8/2011 | Zeitlin et al. |
| 2011/0239306 | A1 | 9/2011 | Avni et al. |
| 2011/0277034 | A1* | 11/2011 | Hanson ............ 726/25 |
| 2012/0005542 | A1 | 1/2012 | Petersen et al. |
| 2012/0079598 | A1* | 3/2012 | Brock et al. ............ 726/25 |
| 2012/0137367 | A1* | 5/2012 | Dupont et al. ............ 726/25 |
| 2012/0167161 | A1 | 6/2012 | Kim |
| 2012/0240183 | A1 | 9/2012 | Sinha |
| 2012/0246297 | A1 | 9/2012 | Shanker et al. |
| 2012/0255012 | A1 | 10/2012 | Sallam |
| 2012/0323853 | A1 | 12/2012 | Fries et al. |
| 2013/0081134 | A1 | 3/2013 | Glew et al. |
| 2013/0198847 | A1* | 8/2013 | Sampigethaya ............ H04L 63/1433 726/25 |
| 2013/0246925 | A1* | 9/2013 | Ahuja et al. ............ 715/738 |
| 2013/0291112 | A1 | 10/2013 | Shue et al. |
| 2013/0304761 | A1 | 11/2013 | Redlich et al. |
| 2013/0305356 | A1* | 11/2013 | Cohen-Ganor et al. ............ 726/22 |
| 2013/0333040 | A1 | 12/2013 | Diehl et al. |
| 2014/0007190 | A1 | 1/2014 | Alperovitch et al. |
| 2014/0013432 | A1* | 1/2014 | Yi ............ 726/23 |
| 2014/0053265 | A1* | 2/2014 | Crowley ............ H04L 43/12 726/22 |
| 2014/0109226 | A1 | 4/2014 | Diehl et al. |
| 2014/0137243 | A1* | 5/2014 | Reutter ............ 726/22 |
| 2014/0189776 | A1* | 7/2014 | Diehl ............ H04L 41/145 726/1 |
| 2014/0208420 | A1* | 7/2014 | Mraz et al. ............ 726/22 |
| 2014/0237599 | A1* | 8/2014 | Gertner et al. ............ 726/24 |
| 2014/0259170 | A1* | 9/2014 | Amsler ............ 726/23 |
| 2014/0380488 | A1* | 12/2014 | Datta Ray ............ H04L 63/1433 726/25 |
| 2015/0101044 | A1* | 4/2015 | Martin ............ G06F 21/552 726/22 |
| 2015/0163121 | A1* | 6/2015 | Mahaffey ............ G06F 11/0766 707/687 |
| 2015/0295948 | A1* | 10/2015 | Hassell ............ H04L 63/1441 726/25 |

FOREIGN PATENT DOCUMENTS

| | | |
|---|---|---|
| WO | WO2012107557 | 8/2012 |
| WO | WO2012135192 | 10/2012 |
| WO | WO2013164821 | 11/2013 |

OTHER PUBLICATIONS

Final Office Action for U.S. Appl. No. 13/538,439, dated Dec. 2, 2014, Dmitri Alperovitch, "Social Sharing of Security Information in a Group", 13 pages.

Final Office Action for U.S. Appl. No. 13/728,746, dated Dec. 3, 2014, David F. Diehl, "Real-Time Representation of Security-Relevant System State", 22 pages.

Office action for U.S. Appl. No. 13/538,439, dated Jun. 30, 2014, Alperovitch et al., "Social Sharing of Security Information in a Group", 13 pages.

Office Action for U.S. Appl. No. 13/728,746, dated Apr. 14, 2014, David F. Diehl, "Real-Time Representation of Security-Relevant System State", 17 pages.

Office Action for U.S. Appl. No. 13/492,672, dated Apr. 7, 2014, David F. Diehl, "Kernel-Level Security Agent", 8 pages.

PCT Search Report and Written Opinion dated Sep. 17, 2013 for PCT application No. PCT/US2013/040420, 12 pages.

PCT Search Report and Written Opinion dated Sep. 26, 2013 for PCT Application No. PCT/US13/40428, 13 pages.

King et al, "Backtracking Intrusions", ACM SOSP, Oct. 2003, vol. 37, Issue 5, 14 pgs.

PCT Search Report and Written Opinion dated Apr. 29, 2014 for PCT application No. PCT/US13/75856, 13 pages.

Office Action for U.S. Appl. No. 13/538,439, dated Apr. 23, 2015, Dmitri Alperovitch, "Social Sharing of Security Information in a Group", 6 pages.

PCT Search Report and Written Opinion dated Apr. 28, 2015 for PCT application No. PCT/US2015/013522, 13 pages.

Office Action for U.S. Appl. No. 13/728,746, dated Jun. 29, 2015, David F. Diehl, "Real-Time Representation of Security-Relevant System State", 26 pages.

PCT Search Report and Written Opinion dated Sep. 10, 2015 for PCT application No. PCT/US2015/033551, 14 pages.

Office action for U.S. Appl. No. 13/728,746, dated Apr. 28, 2016, Diehl, "Real-Time Representation of Security-Relevant System State", 21 pages.

Extended European Search Report dated Jul. 8, 2016 for European Patent Application No. 13867660.6, 6 pages.

Singapore Office Action dated Jan. 10, 2017 for Singapore Patent Application No. 11201504944T, a counterpart foreign application of U.S. Appl. No. 13/728,746, 6 pages.

Singapore Office Action dated Apr. 27, 2016 for Singapore Patent Application No. 11201504944T, a counterpart foreign application of U.S. Appl. No. 13/728,746, 8 pages.

* cited by examiner

REAL-TIME MODEL OF STATES OF MONITORED DEVICES

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To meet the threats posed by these security exploits, a number of tools capable of retrospective analysis of system performance and state have been developed. For example, the BackTracker tool described in "Backtracking Intrusions" by Samuel T. King and Peter M. Chen (ACM SIGOPS Operating Systems Review—SOSP '03, Volume 37, Issue 5, December 2003, pgs. 223-236) automatically identifies potential sequences of steps that occurred in an intrusion by analyzing a comprehensive log of system activities and data. While such tools can detect security exploits and their manners of operation, they can only operate retrospectively and thus place those attacked at a disadvantage, always one step behind the attacker. Further, these techniques typically operate only on records of a single device, and thus lack the context of activities occurring on other devices, which may be important in determining whether novel or unusual behavior is suspect.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a model representing system components and events of a plurality of monitored devices as data objects. Examples of such system components include processes and modules, and examples of events include execution chains, event detections, and pattern hits. An agent may reside on each of the monitored devices and may output events to a remote security service cloud, the output events conveying security-relevant information about the system components and events of that device. The security service cloud receives those output events and, in substantially real-time, updates a model based on the output events. The model, which may be a graph model, resides on the security service cloud and represents the system components and events of monitored devices as data objects which service as vertices in the model. The edges connecting those vertices may represent relationships between system components or events. For example, an edge connecting two vertices which represent processes may represent a parent-child relationship between those processes. The security service cloud may include model management module(s) which build the model in real-time as the output events are received.

In various embodiments, the data objects included in the model may each be associated with a scope. For example, an output event providing security-relevant information about a module may be received from a monitored device. If that is the first time information associated with the module has been received from that monitored device, the model management module(s) will add a data object to the model with a property that indicates a device-specific scope for that data object. If group-specific scope or global scope data objects do not exist for that module, the model management module(s) may than create data objects for the module, one with a group-specific scope and another with a global scope. Having multiple data objects for a same module, each data object with a different scope enables a more intelligent response to security concerns. For example if a new behavior is observed for the first time in association with a module on a particular device, that may or may not be of concern. But if the behavior has never been observed before globally, it is far more likely to be of interest or concern. Thus, the different scopes of the data objects enable selection among a number of different security actions.

Further, the security service cloud maintains a model specific to each monitored device built in substantially real-time as the security-relevant information from that monitored device is received. The security service cloud utilizes these device-specific models to detect security concerns and respond to those concerns in substantially real-time.

Example Network

Figure 1:
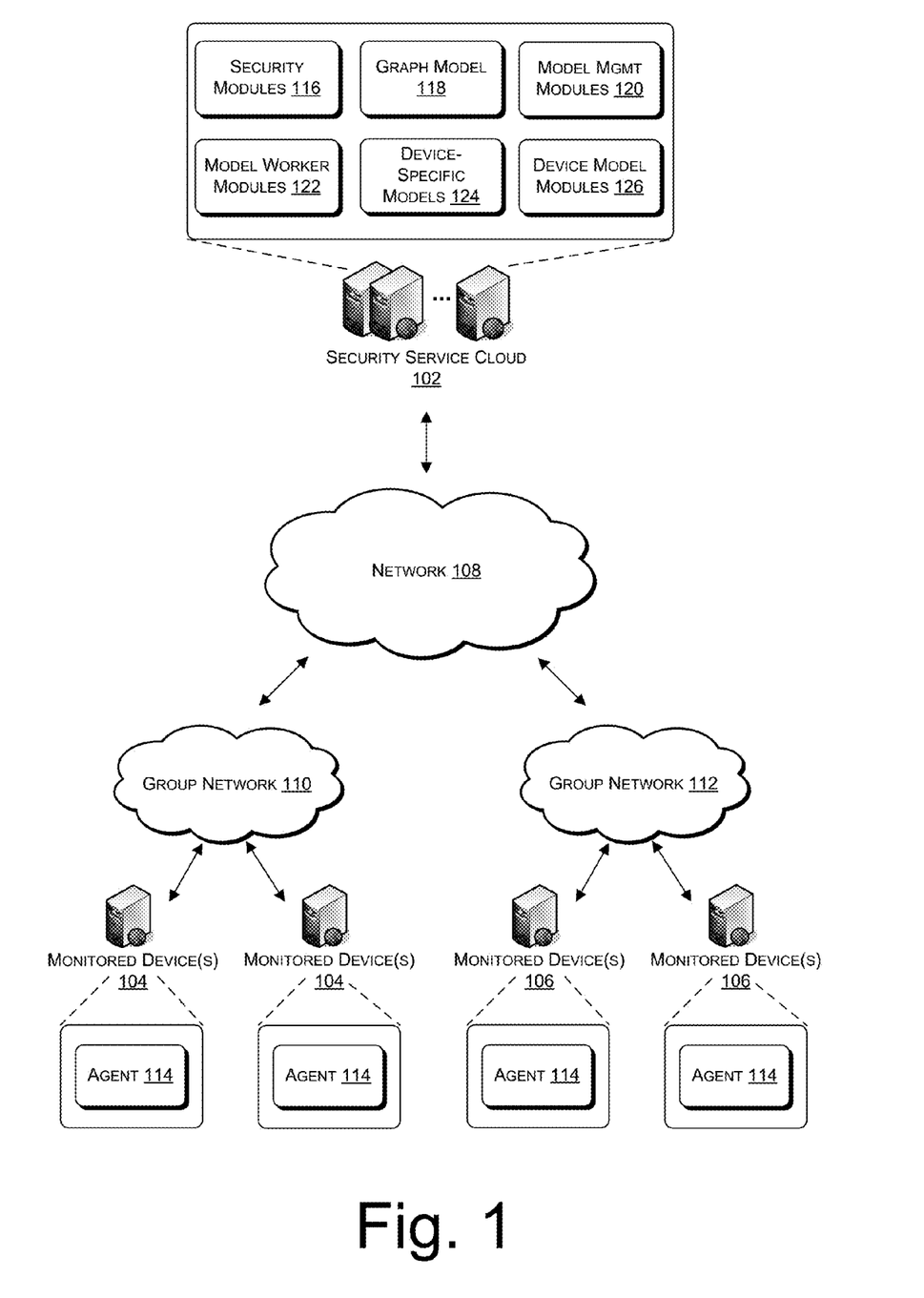
FIG. 1 illustrates a security service cloud which monitors multiple devices of multiple groups and represents components and events of those devices as data objects in a model. The security service cloud builds the model substantially in real-time as information from the devices is received.

FIG. 1 illustrates a security service cloud which monitors multiple devices of multiple groups and represents components and events of those devices as data objects in a model. The security service cloud builds the model substantially in real-time as information from the devices is received. As illustrated in FIG. 1, security service cloud devices 102 (also referred to as "security service cloud 102") may monitor and receive security-relevant information from a plurality of monitored devices 104 and a further plurality of monitored devices 106 via a network 108. Monitored devices 104 may be part of a group, such as a customer or other entity, which may connect the monitored devices 104 to the network 108 via a group network 110. Monitored devices 106 may also be part of a group, which may connect the monitored devices 106 to the network 108 via a group network 112. Each monitored device 104 and 106 may be configured with an agent 114 which may provide events that include security-relevant information to the security service cloud 102. The security service cloud 102 may in turn include security modules 116 to interact with the agents 114, a graph model 118 to represent states of the monitored devices 104 and 106, model management module(s) 120 to update the graph model 118 based on the events output by the agents 114, and model worker module(s) 122 to take actions based on the graph model 118.

In various embodiments, the security service cloud 102 may be a provider of information security services to individual users and subscriber entities, such as maintenance and configuration of the agents 114, tracking of states of monitored devices 104 and 106 configured with the agents 114 via a graph model 118, threat modeling, and/or remediation. An example security service cloud 102 is described in greater detail in U.S. patent application Ser. No. 13/728,746, which is entitled "Real-Time Representation of Security-Relevant System State," was filed on Dec. 27, 2012, and which is hereby incorporated herein by this reference in its entirety.

Figure 5:
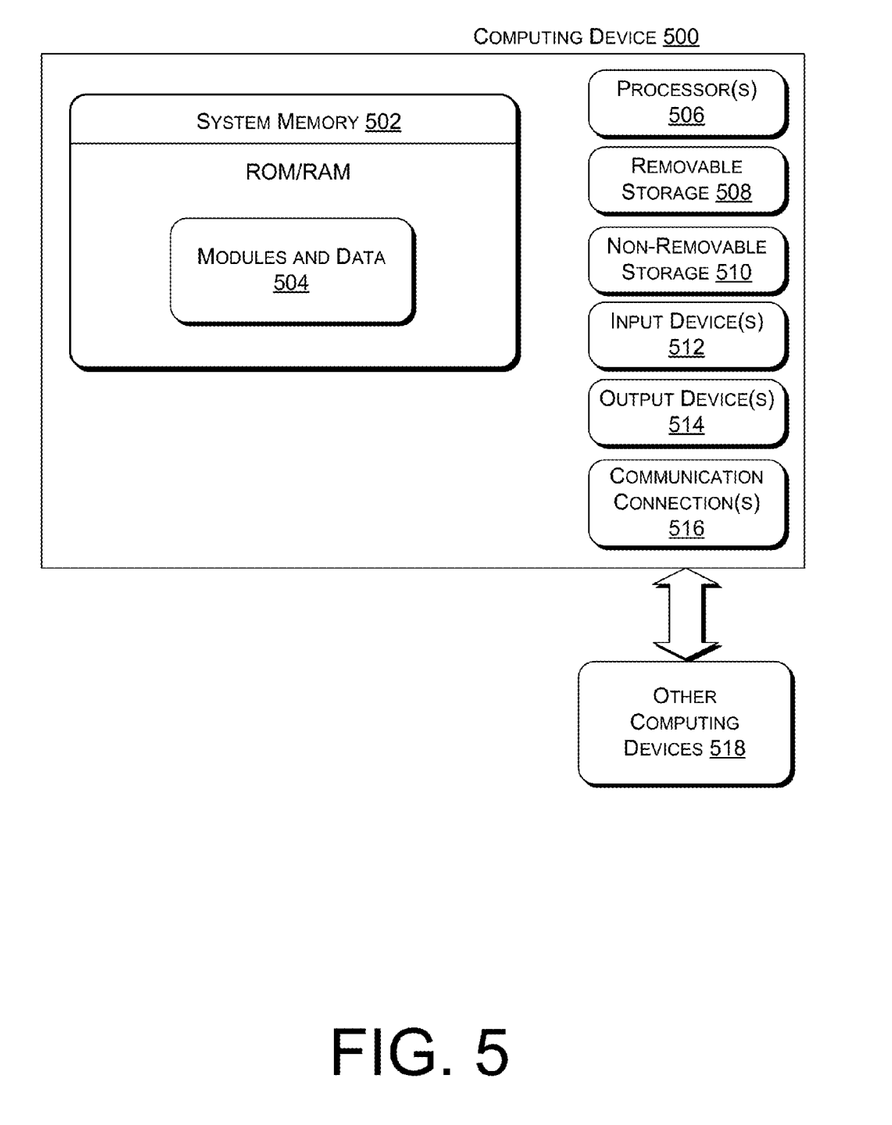
FIG. 5 illustrates a component level view of a computing device capable of acting as a security service cloud device.

The devices implementing the security service cloud 102 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the devices implementing the security service cloud 102 represent a plurality of computing devices working in communication, such as a cloud computing network of nodes. When implemented on multiple computing devices, the security service cloud 102 may distribute the modules and data 116-126 of the security service cloud 102 among the multiple computing devices. In some implementations, one or more of the devices implementing the security service cloud 102 represent one or more virtual machines implemented on one or more computing devices. An example computing device capable of serving as a device implementing the security service cloud 102 is illustrated in FIG. 5 and described below with reference to that figure.

In some embodiments, the monitored devices 104 and 106 may each be a server or server farm, multiple, distributed server farms, a mainframe, a work station, a PC, a laptop computer, a tablet computer, a PDA, a cellular phone, a media center, an embedded system, or any other sort of device or devices. When implemented on multiple computing devices, a monitored device 104/106 may distribute the agent 114 among the multiple computing devices. In some implementations, a monitored device 104/106 represents one or more virtual machines implemented on one or more computing devices.

In various embodiments, the network 108 and group networks 110 and 112 may each include any one or more networks, such as wired networks, wireless networks, and combinations of wired and wireless networks. Further, the network 108 and group networks 110 and 112 may include any one or combination of multiple different types of public or private networks (e.g., cable networks, the Internet, wireless networks, etc.). For example, the network 108 may be a public network and one or both of the group networks 110 and 112 may be a private network. In some instances, computing devices communicate over the network 108 and group networks 110 and 112 using a secure protocol (e.g., https) and/or any other protocol or set of protocols, such as the transmission control protocol/Internet protocol (TCP/IP).

In various embodiments, the monitored devices 104 and group network 110 may be associated with a first entity and the monitored devices 106 and group network 112 may be associated with a second entity. The first and second entities may each be an example of an entity such as a business, government, or other organization, or may be associated with a single user or groups of users. That entity or those user(s) may subscribe for security services with the security service cloud 102, which may monitor activities on monitored devices 104 and 106 of the entity/user(s). In some embodiments, that monitoring may involve installing agents 114 on the monitored devices 104 and 106 to monitor execution activities of the monitored devices 104 and 106 and to provide security-relevant information to the security service cloud 102.

The agents 114 may, in some embodiments, be kernel-level security agents. Such kernel-level security agents may each include event consumers that receive notifications of events associated with execution activities of their respective monitored device 104/106, filters, an event bus that route events to other agent module(s), correlators that track types of events, actors that gather state information and act upon events, and a situational model. The kernel-level security agents may each be installed by and configurable by the security service cloud 102, receiving, and applying while live, reconfigurations of agent module(s) and the agent situational model. Further, the kernel-level security agents may each output events to the remote security service cloud 102, the events including the security-relevant information determined by that agent 114. An example kernel-level security agent is described in greater detail in U.S. patent application Ser. No. 13/492,672, entitled "Kernel-Level Security Agent" and filed on Jun. 8, 2012, which is hereby incorporated herein by this reference in its entirety.

Figure 4:
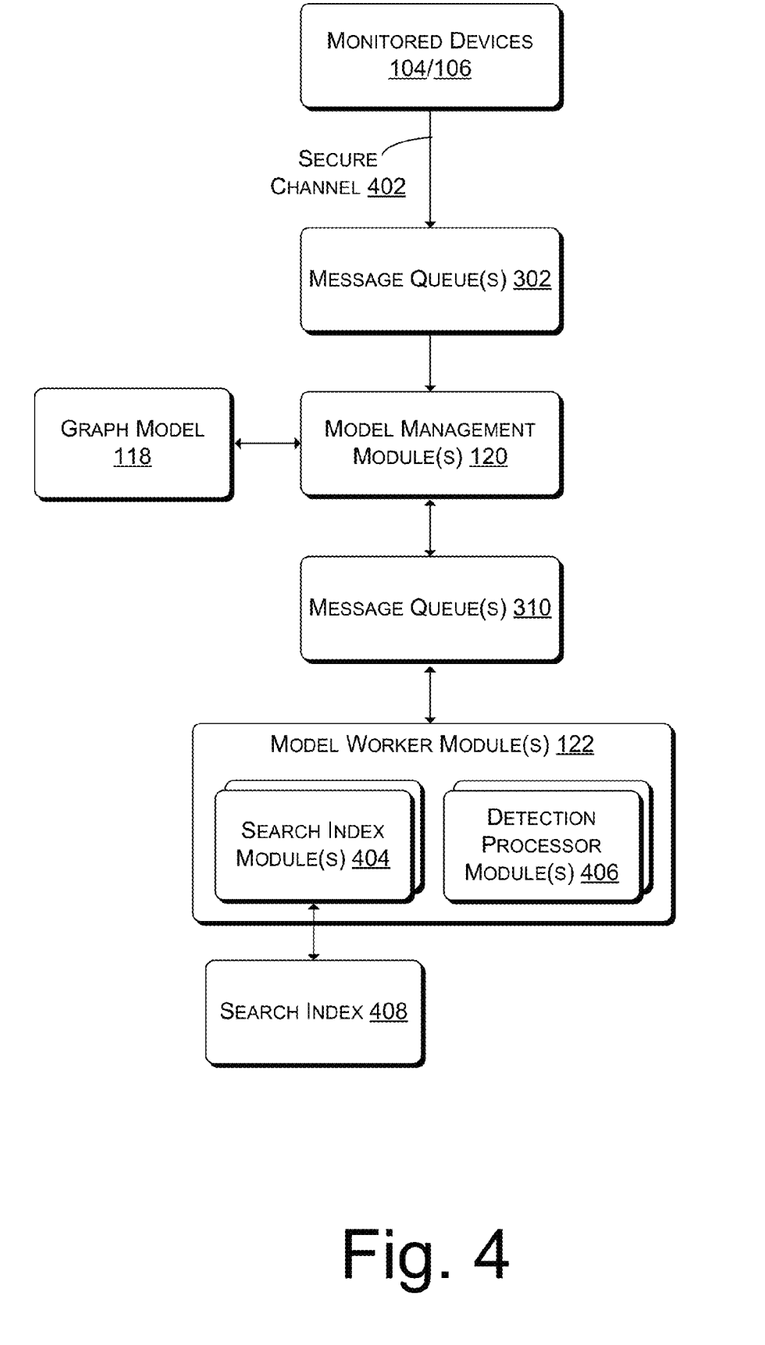
FIG. 4 illustrates message queues for receiving events for the model management module(s) and for receiving output from the model management modules(s), as well as model worker module(s) for generating detection events and a search index for the model.

In some embodiments, the agents 114 may be connected to the security service cloud 102 via a secure channel, such as a virtual private network (VPN) tunnel or other sort of secure channel and may provide events conveying security-relevant information to the security service cloud 102 through the secure channel. The agents 114 may also receive configuration updates, instructions, remediation, etc. from the security service cloud 102 via the secure channel. An example secure channel is shown in FIG. 4 and discussed below with reference to that figure.

In various embodiments, as illustrated in FIG. 1, the security service cloud 102 includes security modules 116 that configure the monitored devices 104 and 106, specifying what security-relevant information the monitored devices 104 and 106 are to provide to the security service cloud 102 via events output by the agents 114. Such security-relevant information may be information that, in isolation on a single monitored device 104/106 may or may not meaningful, but when received from multiple monitored devices 104/106 is meaningful. Alternatively, the security-relevant information may include any information about system components or events of the monitored devices 104 and 106 associated with execution activities of the monitored devices 104 and 106.

In further embodiments, the security service cloud 102 may build and maintain a graph model 118 representing states of multiple monitored devices 104 and 106. Such states may include current states, past states, or both. The security service cloud 102 may receive security-relevant information in events used to build the graph model 118 from the monitored devices 104 and 106 responsive to a configuration of those monitored devices 104 and 106. Such security-relevant information may be received in substantially real time as the execution activities associated with the security-relevant information are observed. The security relevant information may relate to system components of the monitored devices, such as processes and modules, to events of the monitored devices 104 and 106, such as detections of activities, recognitions of execution patterns (pattern hits), or chains of execution activities, or to both. These system components or events are represented as data objects, which may form the vertices of the graph model 118, and relationships between these system components or events (e.g., a parent-child relationship between processes) are represented as edges in the graph model 118.

In various embodiments, the graph model 118 may be stored in any sort of database, file, or collection of data capable of storing information. The database is a store with a configurable set of data objects, such as tables, which form the graph model 118. Each data object may represent a type of object about which the database stores data and may be indexed by an identifier. Each data object may include an index field, an object type (e.g., process object, model object, tree object, detection object, patternhit object, etc.) indications of other objects with which the data object has relationships, as well as indications of the types of those relationships, a scope for the data object (e.g., device-specific scope, group-specific scope, global scope), other modeled data attributes (e.g., security-relevant information), etc. For some object types (e.g., detection objects or patternhit objects), the scope of the data object may be implicit (e.g., implicitly a device-specific scope), and such data objects may not include a property or field for scope. For other object types, scope may be explicitly declared in a field or property of the data object.

Data objects may also include tags, which are data object metadata that acts as a label or classifier of a data object. A tag may be a string, an integer, a hash, a binary flag, or some other efficient representation. Tags enable filtering of data objects for reporting, decision-making, and event generation and allow reclassification of data objects without any need for recoding or recompiling. Properties and fields of the data object may be examples of tags. U.S. patent application Ser. No. 14/169,401, filed on Jan. 31, 2014 and entitled "Tagging Security-Relevant System Objects," discusses tags in greater detail. U.S. patent application Ser. No. 14/169,401 is hereby incorporated herein by this reference.

Figure 2:
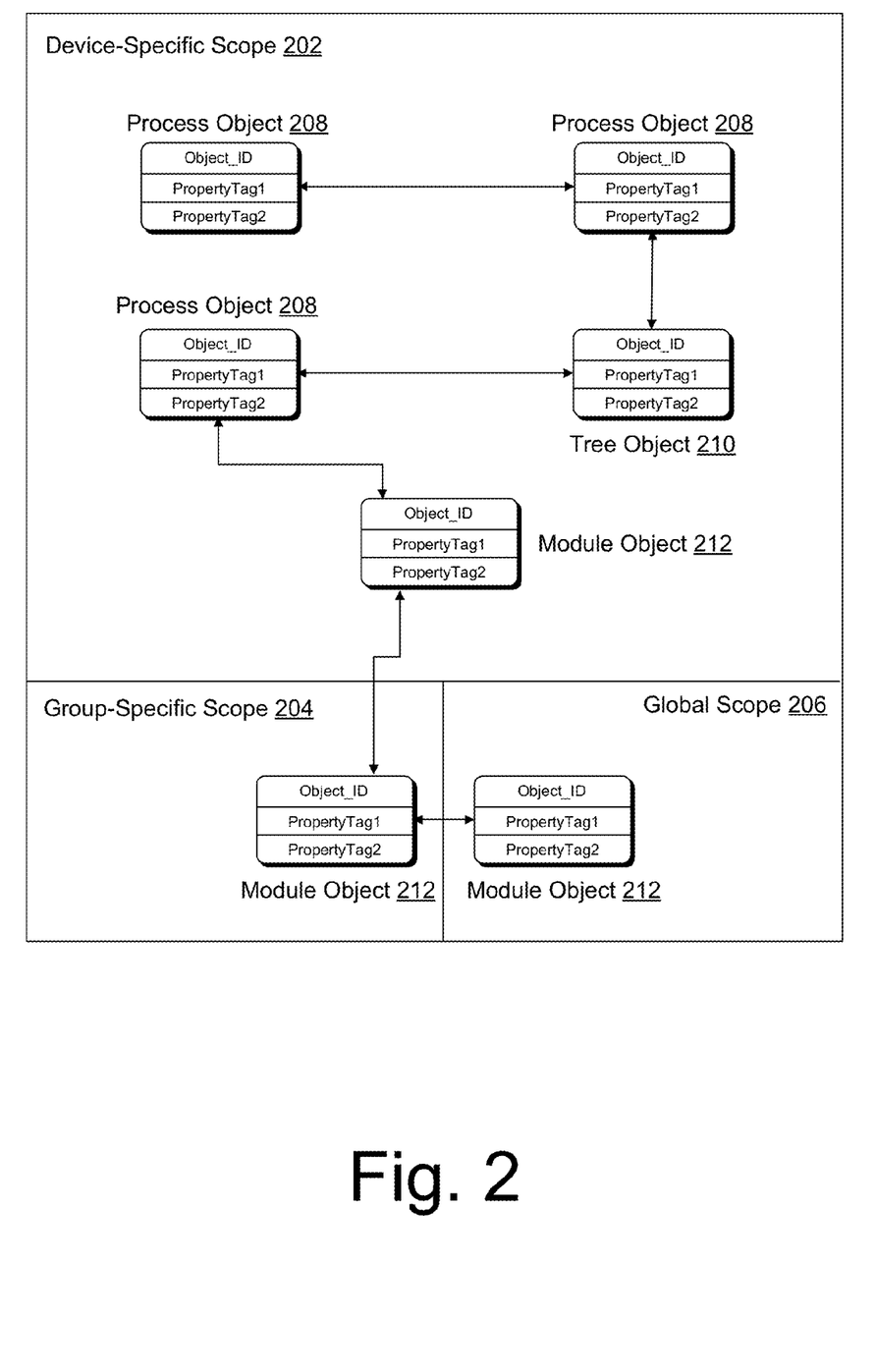
FIG. 2 illustrates example data objects of the model, their relations, and depicts their differing scopes.

An example of data objects of the database of the graph model 118 is illustrated by FIG. 2. FIG. 2 illustrates a plurality of data objects as vertices in the graph model 118, depicts relationships of those system components or events represented by the data objects, and depicts scopes of the data objects. As shown, each data object may have a device-specific scope 202, a group-specific scope 204, or a global scope 206. For example, the database of the graph model 118 may include three process objects 208. The edge between two of these process objects 208 may represent a parent-child relationships between the processes represented by those process objects 208. The edges between two of the process objects 208 and the tree object 210 may represent that the processes associated with those process objects are part of an execution chain represented by the tree associated with the tree object 210. The module associated with the module object 212 with the device-specific scope 202 may be a module of the process associated with the process object 208 that is connected by an edge with that module object 212. The module object 212 may then be connected by an edge with a corresponding module object 212 having a group-specific scope 204, and the corresponding module object 212 having the group-specific scope 204 may be connected by an edge with a corresponding module object 212 having a global scope 206.

A "group-specific" scope 204 means that the data object with that scope is associated with a collection of monitored devices belonging to a single group/entity. For example, a module object 212 with a group-specific scope 204 may be associated with a group having the group network 112 and monitored devices 106. A "global" scope 206 means that the data object with that scope is associated with all monitored devices 104 and 106 represented in the graph model 118. The data objects having a group-specific scope 204 or global scope 206 may be created by model management module(s) 120 responsive to any of a number of conditions. The creation of such data objects by the model management module(s) 120 is described in further detail with respect to FIG. 3.

In various embodiments, the security modules 116 may, in substantially real-time as the graph model 118 is built, take different actions depending on the scopes of different data objects of the graph model 118. For example, a component or behavior may be observed for a first time globally, on any monitored device 104/106, and represented as a property only of a data object with a device-specific scope but not represented in the corresponding group-specific scope or global scope data objects. This may be noted by the model management module(s) 120 and trigger action by the security modules 116, such as gathering further information from the monitored device 104/106 with the suspect component/behavior, reconfiguring the agent 114 of that monitored device 104/106, or performing remediation/healing on the monitored device 104/106

In another example, a component or behavior may be observed for the first time on a specific monitored device 104/106 that has previously been observed on other monitored device(s) 104/106. This may also be noted by the model management module(s) 120 and trigger action by the security modules 116. Such action may be different (e.g., wait and recheck after a time period) than if the component or behavior were encountered for the first time globally or for a specific group.

In some embodiments, rather than responding to triggers of the model management module(s) 120, the security modules 116 may query the graph model 118 for specific patterns, detections, etc., determine associated scopes, and take action based at least partially on the scopes of data objects which include the retrieved information.

Figure 3:
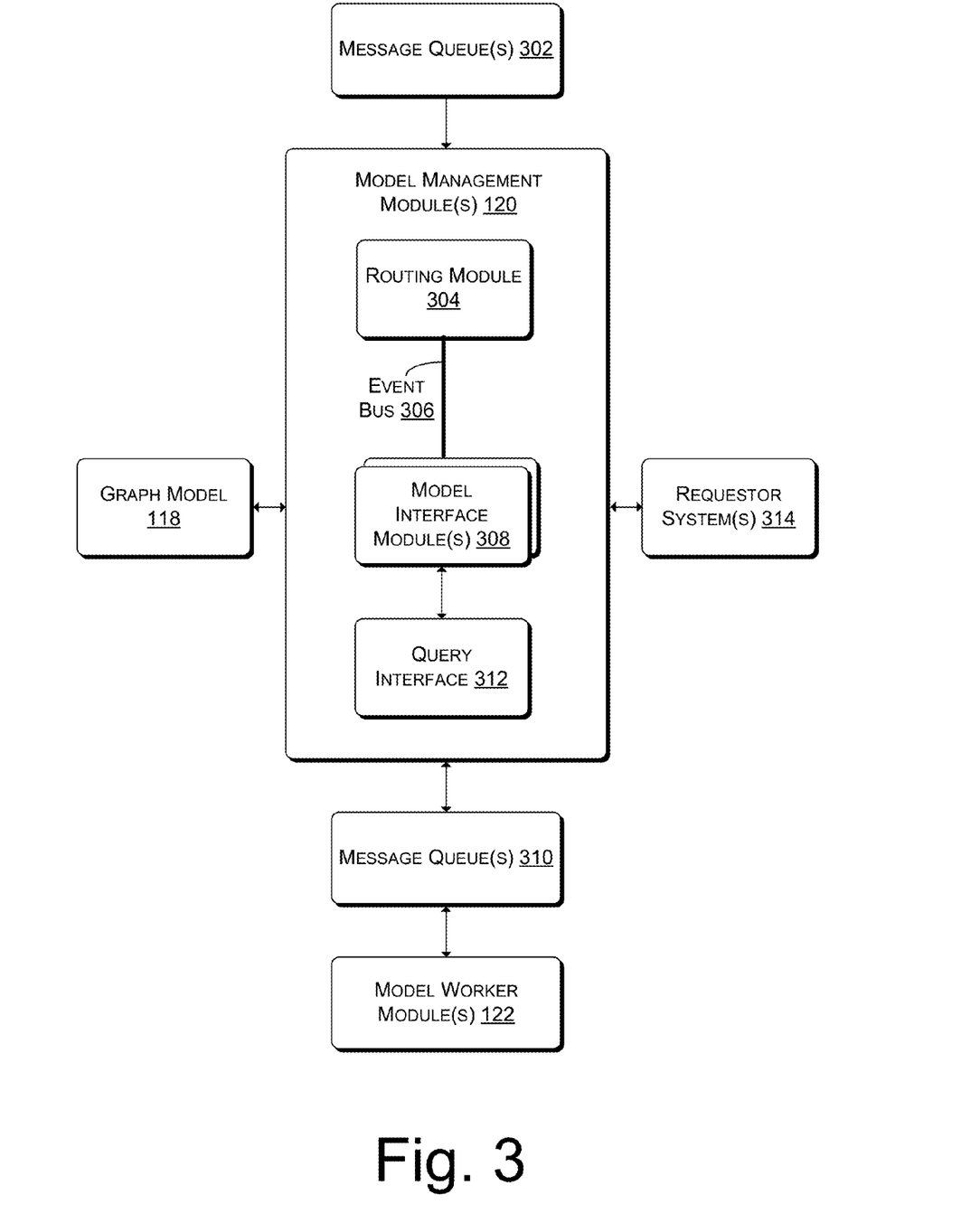
FIG. 3 illustrates example model management module(s) of the security service cloud which receive security-relevant information from the monitored devices as one or more events, map those events to the creating, updating, or linking of model data objects, and update the model.

Model management module(s) 120 may, in substantially real-time as the agents 114 output events, receive events, update the graph model 118 based on those events, and respond to queries seeking information from the graph model 118. Examples of model management module(s) 120 are illustrated in FIG. 3 and are described below in detail with reference to that figure.

Model worker module(s) 122 may, in substantially real-time as the graph model 118 is built, perform additional processing related to the graph model 118, such as generating a search index for the graph model 118, performing analysis and threat detection on the graph model 118, etc. Examples of model management module(s) 122 are illustrated in FIG. 4 and are described below in detail with reference to that figure.

In various embodiments, the security service cloud 102 may also store in-memory device-specific graph models 124, such as a graph model 124 for each monitored device 104/106. Each graph model 124 may be associated with an actor module of the security service cloud 102, which may be responsible for building its respective graph model 124. The actor module may receive events from a routing module of the model management module(s) 120 in substantially real-time. These events may comprise all events associated with the monitored device 104/106 which the graph model 124 for that actor module is specific to. The actor module may then build the graph model 124 in substantially real-time as it receives the events and in a manner similar to that by which the model management module(s) build the graph model 118. Like the graph model 118, the graph model 124 may also comprise data objects for system components and events which are represented as vertices, with relationships between/among those component/events represented as edges. The data objects of the graph models 124 may lack scope properties, however.

In further embodiments, the security service cloud 102 may also include device model modules 126 which examine and react to the information represented by the graph models 124 in substantially real-time as those graph models 124 are built. Each device model module 126 may examine the graph models 124 for a specific pattern or detection (referred to herein as a "security concern") and take action in response. Different device model modules 126 may be specific to different security concerns. Actions taken in response may include reconfiguration of an agent 114, remediation of a monitored device 104/106, etc. The device model modules 126 may also retrieve information from other sources, such as the graph model 118, a different graph model 124 than that exhibiting the security concern, or a remote source, and use that information in an analysis of the security concern. The device model modules 126 may then react based both on information associated with the security concern and on the information retrieved from the other sources.

Example Model Management Module(s)

FIG. 3 illustrates example model management module(s) of the security service cloud which receive security-relevant information from the monitored devices as one or more events, map those events to the creating, updating, or linking of model data objects, and update the model. As illustrated, model management module(s) 120 may receive or retrieve events from message queues 302. A routing module 304 of the model management module(s) 120 maps received/retrieved events to the creating, updating, or linking of data objects of the graph model 118 and outputs events via an event bus 306 to model interface module(s) 308. The model interface module(s) 308 may then update the graph model 118 and output events to message queues 310 for utilization by model worker module(s) 122. The model management module(s) 120 may also include a query interface 312 to receive queries from requestor system(s) 314 and to query the graph model 118 through the model interface module(s) 308.

In various embodiments, output events from the monitored devices 104 and 106 are received by the security service cloud 102 and stored in the message queue 302. The message queue 302 may be a distributed topic queue system that is used as a guaranteed delivery layer. An example of such a message queue 302 is a Kafka cluster from Apache™.

In some embodiments, a routing model 304, which includes an event domain specific language (DSL), may receive or retrieve events from the message queue 302 and process the received events. The routing module 304 may utilize the DSL to evaluate received/retrieved events, determining based on the DSL what set of events maps to creating, updating, or linking a specific type of data object (e.g., a tree object). The routing module 304 then outputs trigger events via the event bus 306 to one or more model interface module(s) 308. In a number of embodiments, the routing module 304 may direct specific types of trigger events (e.g., events triggering the creation of a process object) to specific one(s) of the model interface module(s) 308. In some embodiments, the routing module 304 may also receive or retrieved events from the message queue 310, such as detection events generated by model worker module(s) 122.

Also, in various embodiments, the routing model 304 may determine that the received/retrieved events include security-relevant information which does not map to the creating, updating, or linking of a data object, but rather is additional referential data associated with one or more of the data objects. The routing module 304 may emit trigger events to the model worker module(s) 122 for storage of the additional referential data in a secondary storage device. These emitted events may be stored in and retrieved from the message queue 310.

In further embodiments, model interface module(s) 308 may include one or more actor modules which update the graph model 118. For example, the model interface module(s) 308 may include one or more actor modules for each object type (e.g., a process object actor module) which receive trigger events over the event bus 306 and update the graph model 118 based on the received events. An actor module could create a data object as a vertex in the graph model 118 and link it to other data objects based on relationships between the system components/events represented by the data objects. An actor module could also update a data object by, for instance, adding or modifying a tag, a field, or property. Also, an actor module could add a link between two previously unlinked data objects.

Additionally, upon creating a data object for a component/event with a device-specific scope, the model interface module(s) 308 may determine if data objects exist for that component/event with group-specific or global scopes. If not, the model interface module(s) 308 may create the data objects with group-specific or global scopes. In some embodiments, such data objects with group-specific or global scopes may be created asynchronously by the model interface module(s) 308.

In addition to creating data objects with group-specific or global scopes, the model interface module(s) 308 may propagate tags, properties or fields of a data object representing a component/event to other data objects with different scopes representing the same component/event. For example, if a tag is added to a device-specific scoped data object which indicates a specific behavior, that tag may be propagated to counterpart data objects with group-specific and/or global scopes. In some embodiments, this propagation may be conditioned based on models, thresholds, etc. of the configuration of the security service cloud 102. Further, the propagation of a new tag to other data objects with different scopes representing the same component/event may trigger an action, such as further analysis, monitoring, remediation, etc.

In various embodiments, the model interface module(s) 308 may also include actor module(s) which query the graph model 118 in response to being invoked by the query interface 312. Such model interface module(s) 308 may utilize a search index built by model worker module(s) 122 to avoid a more costly traversal of the full graph model 118.

In further embodiments, the model interface module(s) 308 may emit events to the message queue 310 for processing by the model worker module(s) 122. The model interface module(s) 308 may, for instance, emit events indicated updates made to the graph model 118. Like the message queue 302, the message queue 310 may be a distributed topic queue system that is used as a guaranteed delivery layer. An example of such a message queue 310 is a Kafka cluster from Apache™. The model worker module(s) 122 may then use the topics of the message queue 310 to coordinate their activities.

In various embodiments, the model management module(s) 120 further include a query interface 312 to receive queries from requestor systems 314. Requestor systems 314 may include other components of the security service cloud 102, such as security modules 316, other model management module(s) 120, model worker module(s) 122, or device model modules 126. Alternatively or additionally, requestor systems 314 may include third party or affiliated systems.

The query interface 312 may include an API that enables the requestor system 314 to specify or select from a number of parameters. For example, a requestor system 314 may desire to know how many monitored devices 104 of the group associated with group network 110 exhibit a specific malicious activity. In another example, rather than determining the prevalence of the specific malicious activity within a group, the query may seek to identify the prevalence of the activity across groups. The query interface 312 may then invoke model interface module(s) 308 to retrieve the security-relevant information sought in the query from the graph model 118. Upon receiving a query result from the model interface module(s) 308, the query interface 312 may add metadata or other information and provide the result to the requestor system 314. In some embodiments, in addition to retrieving security-relevant information from the graph model 118, the query interface 312 may retrieve additional referential information associated with the data objects of the graph model 118 but which is not stored in the graph model 118. This additional referential information may then be included with the query result obtained by the query interface 312 from the model interface module(s) 308.

Example Model Worker Module(s)

FIG. 4 illustrates message queues for receiving events for the model management module(s) and for receiving output from the model management modules(s), as well as model worker module(s) for generating detection events and a search index for the model. As illustrated, a message queue 302 may receive output events from monitored devices 104 and 106 via a secure channel 402. The model management module(s) 120 update the graph model 118 based on those events and output events to message queues 310. Model worker module(s) 122, such as the search index module(s) 404 or detection processor module(s) 406 may receive or retrieve events from the message queues 310 may perform a number of functions associated with the graph model 118. For example, the search index module(s) 404 may build a search index 408 for the graph model 118.

In various embodiments, the events from a monitored device 104/106 may be received over a secure channel 402, such as a bi-directional event channel, between the agent 114 of that monitored device 104/106 and the security service cloud 102. A termination layer at each of an agent 114 and the security service cloud 102 may perform TLS encryption of some other form of encryption for the communications between that agent 114 and security service cloud 102. The termination layer on the security service cloud 102 may also include an agent that persists received events into the message queue 302.

After updating of the graph model 118 by the model management module(s) 120 based on events from the message queue 302, and after outputting of events to the message queue 310, the model worker module(s) 122 may retrieve or receive events from the message queue 310. These model worker module(s) 122 may include search index module(s) 404 that build a search index 408 for the graph model 118 based on events output through the message queue 310. The search index module(s) 404 listen for events in the message queue 310 and builds elastic search clusters for the search index 408 based on those events. The search index 408 may then be used by the model interface module(s) 308 when retrieving information from the graph model 118.

In various embodiments, detection processor module(s) 406 may receive or retrieve events from the message queue 310 and determine whether information included in those events maps to a detection event. When the information maps to a detection event, the detection processor module(s) 406 generates a detection event and provides the detection event to the model management module(s) 120 through the message queue 310. For example, the received event from the message queue 310 may be a "ProcessCreated" event, and the detection processor module(s) 406 may generate a detection event responsive to the "ProcessCreated" event. The model interface module(s) 308 of the model management module(s) 120 may then add a detection object to the graph model 118 based on the detection event.

Example System

FIG. 5 illustrates a component level view of a computing device capable of acting as a device of a security service cloud. As illustrated, computing device 500 comprises a system memory 502 storing modules and data 504. Also, computing device 500 includes processor(s) 506, a removable storage 508 and non-removable storage 510, input device(s) 512, output device(s) 514 and communication connections 516 for communicating with other computing devices 518.

In various embodiments, system memory 502 is volatile (such as RAM), non-volatile (such as ROM, flash memory, etc.) or some combination of the two. The modules or data 504 stored in the system memory 502 may comprise methods, threads, processes, applications or any other sort of executable instructions, such as the instructions utilized to perform operations of the security service cloud 102 in conjunction with other devices of the security service cloud 102 (in examples in which the security service cloud 102 includes multiple devices). The modules and data 504 may also include files and databases.

In some embodiments, the processor(s) 506 is a central processing unit (CPU), a graphics processing unit (GPU), or both CPU and GPU, or other processing unit or component known in the art.

Computing device 500 also includes additional data storage devices (removable and/or non-removable) such as, for example, magnetic disks, optical disks, or tape. Such additional storage is illustrated in FIG. 5 by removable storage 508 and non-removable storage 510. Non-transitory computer-readable media may include volatile and nonvolatile, removable and non-removable media implemented in any method or technology for storage of information. System memory 502, removable storage 508 and non-removable storage 510 are all examples of computer-readable storage media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, tangible medium which can be used to store the desired information and which can be accessed by the computing device 500. Any such non-transitory computer-readable media may be part of the computing device 500.

Computing device 500 also has input device(s) 512, such as a keyboard, a mouse, a touch-sensitive display, voice input device, etc., and output device(s) 514 such as a display, speakers, a printer, etc. These devices are well known in the art and need not be discussed at length here.

Computing device 500 also contains communication connections 516 that allow the computing device 500 to communicate with other computing devices 518, such as any or all of the monitored devices 104 or 106.

Example Processes

Figure 6:
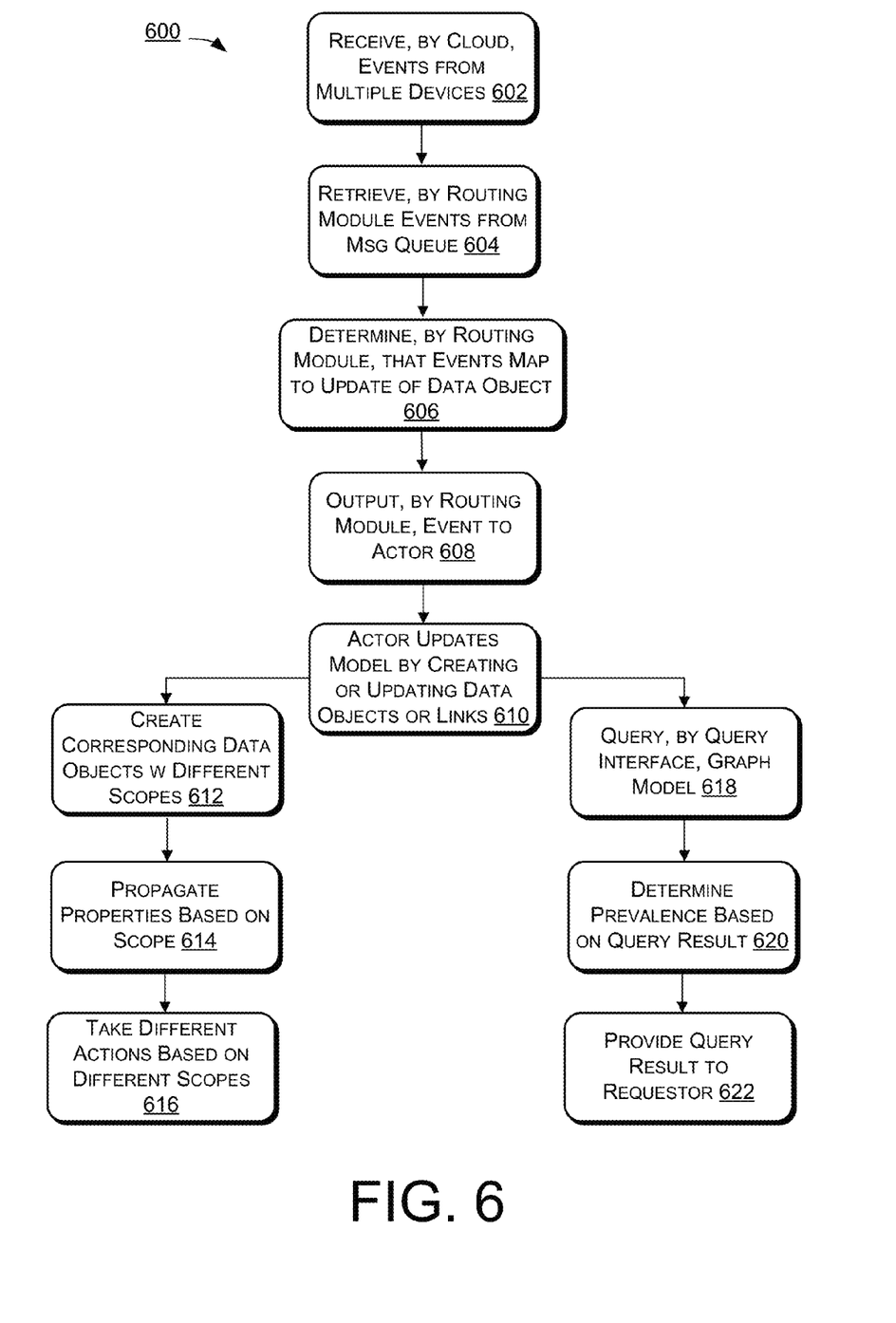
FIG. 6 illustrates an example process for building, by a security service cloud, a model of state of a plurality of monitored devices in substantially real-time and utilizing the scope of data objects in the model to perform different security actions.
Figure 7:
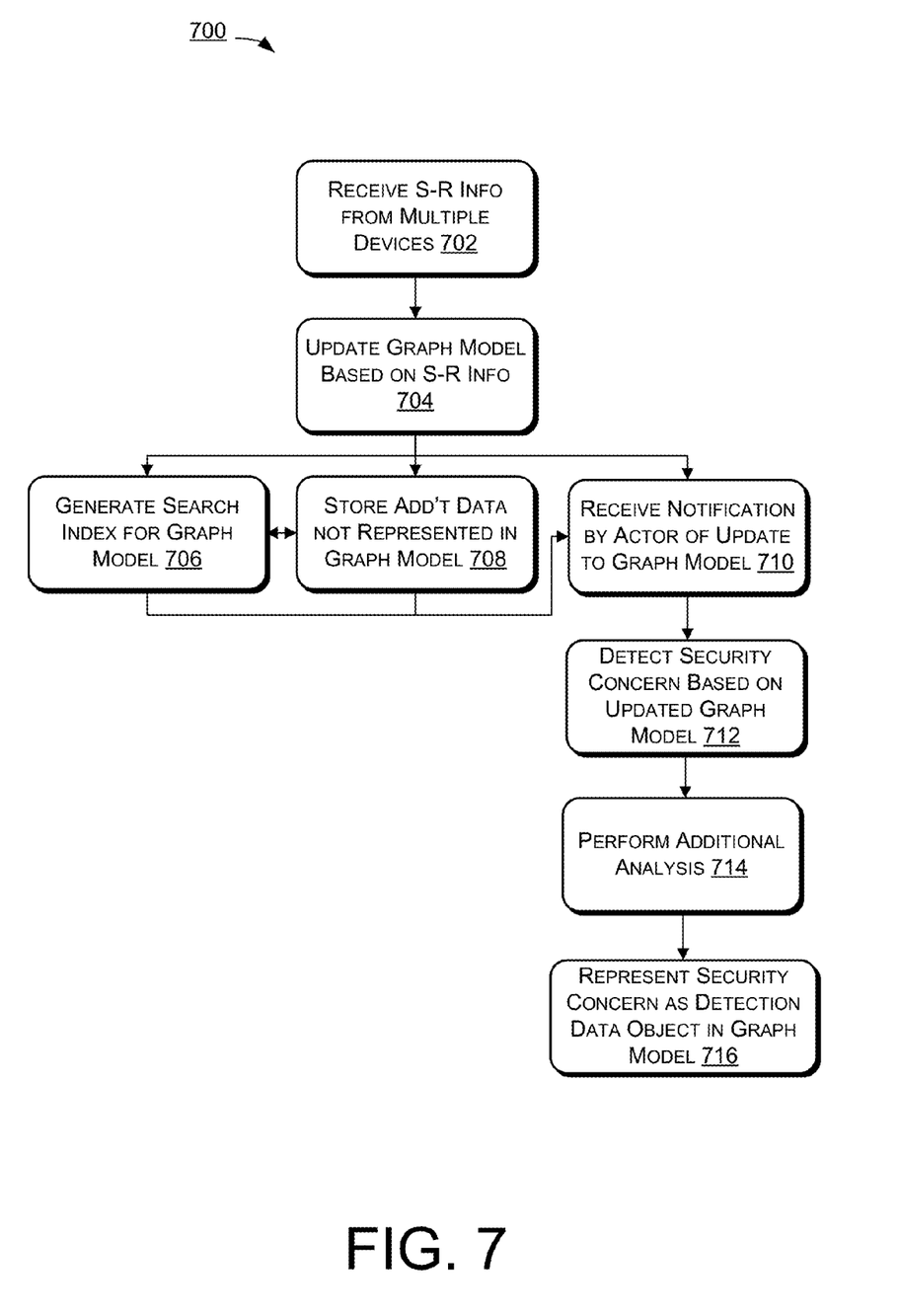
FIG. 7 illustrates an example process for building, by a security service cloud, a model of state of a plurality of monitored devices in substantially real-time, detecting security concerns based on the updated model, and adding detection data objects to the model to represent those security concerns.
Figure 8:
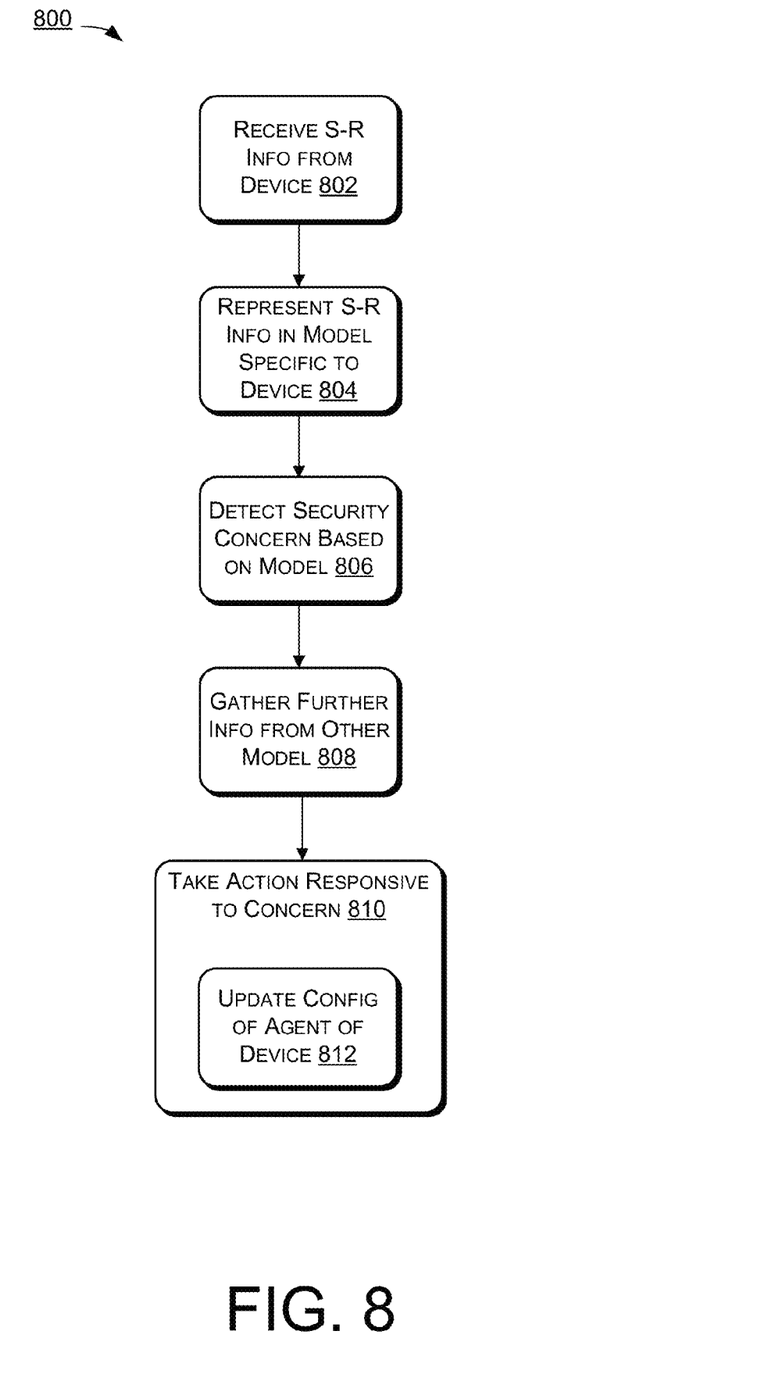
FIG. 8 illustrates an example process for building, by a security service cloud, a model specific to a monitored device and, in substantially real-time, detecting security concerns based on the device-specific model and responding to those concerns.

FIGS. 6-8 illustrate example processes 600, 700, and 800. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process 600 for building, by a security service cloud, a model of state of a plurality of monitored devices in substantially real-time and utilizing the scope of data objects in the model to perform different security actions. The process 600 includes, at 602, receiving, by a security service cloud, events output by a plurality of monitored devices. The output events include security-relevant information associated with system components or events of the monitored devices. Examples of such system components include processes and modules, and examples of events include execution chains, event detections, and pattern hits. The output events are received by the security service cloud and stored in a guaranteed delivery layer message queue.

At 604, a routing module of the security service cloud receives or retrieves the output event from the message queue. At 606, the routing module then determines that a set of one or more output events is mapped to a creation, updating, or linking of a data object in the graph model and, at 608, outputs an event to an actor module. Both the routing module and the actor module may be examples of model management module(s) 120.

At 610, the actor module updates the model in substantially real-time as the events are received from the monitored device by creating, updating, or linking data objects based on the events received from the routing module. Each data object is represented as a vertex in the graph model, and edges connecting the vertices represent relations between the system components or events represented by the data objects. Further, each data object has a scope, such as a device-specific scope, a group-specific scope, or a global scope. The scopes may be explicit properties of some data objects of the graph model and may be implicit properties of other data objects of the graph model At 612, the actor module may create additional data objects with different scopes. For example, if at 610 the actor module created a data object for a system component with a device-specific scope, then the actor module may, at 612, create corresponding group-specific scope and global scope data objects for that system component. At 614, the actor module may then propagate properties of a data object with one scope to other data objects with different scopes based on the shared reference of those data objects to a same system component or event. At 616, a module of the security service cloud, such as a model worker module or other security module, may perform one of a plurality of different actions based on one of the data objects, wherein the one of the plurality of different actions is selected based the scope of the one of the data objects. In some embodiments, the module takes a different action based on whether a system component or behavior is observed for a first time globally, on any monitored device, or whether the system component or behavior is observed for the first time on a specific monitored device but has previously been observed on another monitored device. In further embodiments, the action may be selected and triggered based on the propagation of the tag at 614.

At 618, a query interface of the security service cloud, which may be a model management module 120 or another sort of module, may query the graph model at the behest of a requestor. For example, the requestor may seek all detection events associated with a group, and the query interface may query the graph model for all detection events associated with that group. At 620, the may determine the prevalence of a security concern within a group or across groups based on scopes of the data objects referenced in the result from the query. For example, the query interface may determine that exploit activity has been detected more on one monitored device of a group than on other monitored devices of the group. At 622, the query interface may provide the query result, with metadata added, to the requestor.

FIG. 7 illustrates an example process 700 for building, by a security service cloud, a model of state of a plurality of monitored devices in substantially real-time, detecting security concerns based on the updated model, and adding detection data objects to the model to represent those security concerns. The process 700 includes, at 702, receiving from a plurality of monitored devices, by a security service cloud, security-relevant information about system components or events of those monitored devices.

At 704, the security service cloud may, in substantially real-time as the security-relevant information is received, update a graph model representing the system components or events of the plurality of monitored devices as data objects. The data objects may represent processes, modules of processes, execution chains of processes, event detections, or pattern hits.

At 706, the security service cloud may then create a search index for finding security relevant information without having to traverse the graph model.

At 708, the security service cloud may also store additional data relevant to the data objects but which is not represented in the graph model.

At 710, a worker module, such as one of the one or more model worker modules 122, of the security service cloud may then receive notification of the update to the graph model through a message queue. At 712, the worker module may then, in substantially real-time, detect a security concern associated with the represented system components or events. At 714, the worker module may perform additional analysis in response to detecting the security concern and, at 716, in substantially real-time, may represent the security concern as a detection data object in the graph model.

FIG. 8 illustrates an example process 800 for building, by a security service cloud, a model specific to a monitored device and, in substantially real-time, detecting security concerns based on the device-specific model and responding to those concerns. The process 800 includes, at 802, receiving, by a security service cloud, security-relevant information from a monitored device.

At 804, the security service cloud represents the security-relevant information in a model specific to the monitored device, such as a device-specific model 124, in substantially real-time as the security information is received. The model specific to the monitored device may be associated with an actor module, such as one of the device model modules 126 or another module, that is responsible for maintaining the model specific to the monitored device.

At 806, the security service cloud may then detect, in substantially real-time as the security relevant information is represented, a security concern associated with the security-relevant information represented in the model. In some embodiments, the detecting comprises detecting different security concerns by different modules of the security service cloud. The different modules may each be configured to detect one or more different security concerns.

At 808, the security service cloud may gather further information from the model representing the state of a plurality of the monitored devices or from one or more other sources responsive to detecting the security concern. The one or more other sources may include other device-specific models.

At 810, the security service cloud may, in response to detecting the security concern, take an action, in substantially real-time as the security concern is detected, based at least in part on the security-relevant information represented in the model and on security-relevant information received from a plurality of monitored devices and represented by the other model. At 812, taking the action comprises at least one of updating a configuration of an agent of the monitored device from which the security-relevant information was received, triggering an action on that monitored device, or updating runtime data in that monitored device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
memory storing:
    a model which represents system components and events of a plurality of monitored devices as data objects, wherein each data object has a scope, wherein a system component present on multiple ones of the plurality of monitored devices is represented in the model by at least two data objects including a first data object with a device-specific scope and a second data object with a group-specific scope or a global scope, and wherein the device-specific scope, the group-specific scope, and the global scope differ in scope; and
    computer-executable instructions which, when executed by the one or more processors, cause the system to:
        select one of a plurality of different actions based at least in part on:
            a propagation of a property from the first data object to the second data object; and
            (i) the device-specific scope of the first data object or
            (ii) the group-specific scope or the global scope of the second data object; and
        perform the selected one of the plurality of different actions.

2. The system of claim 1, wherein each data object is represented as a vertex in a graph, and edges connecting the vertices represent relations between the system components or events represented by the data objects.

3. The system of claim 1, wherein the system component present on the multiple ones of the plurality of monitored devices is represented in the model by three data objects including the first data object with the device-specific scope, the second data object with the group-specific scope, and a third data object with the global scope.

4. The system of claim 3, wherein the computer-executable instructions, when executed by the one or more processors, further cause the system to propagate the property of the first data object to the second data object and the third data object based on their shared association with the system component.

5. The system of claim 4, wherein selecting the one of the plurality of different actions is further based at least in part on the propagation of the property from the first data object to the second data object and the third data object.

6. The system of claim 1, wherein the computer-executable instructions, when executed by the one or more processors, further cause the system to take different actions of the plurality of different actions based on whether a system component or behavior is observed for a first time globally, on any monitored device, or whether the system component or behavior is observed for the first time on a specific monitored device but has previously been observed on another monitored device.

7. The system of claim 1, wherein the computer-executable instructions, when executed by the one or more processors, further cause the system to:
    determine, based on a configuration, that a set of events is mapped to a creation, updating, or linking of a data object in the model; and
    output an event to cause the creation, updating, or linking of the data object.

8. The system of claim 7, wherein the computer-executable instructions, when executed by the one or more processors, further cause the system to update the model responsive to receiving the output event.

9. The system of claim 8, wherein updating the model comprises updating the model in real-time as the output event is received.

10. The system of claim 1, wherein the computer-executable instructions, when executed by the one or more processors, further cause the system to query the model on behalf of a requestor, add metadata to a result from the query, and provide the result with the added metadata to the requestor.

11. The system of claim 10, wherein the computer-executable instructions, when executed by the one or more processors, further cause the system to determine prevalence of a security concern within a group or across groups based on scopes of the data objects referenced in the result from the query.

12. The system of claim 1, wherein the scopes are explicit properties of some data objects of the model and are implicit properties of other data objects of the model.

13. A method implemented by one or more devices of a security service cloud, comprising:
   receiving security-relevant information from a monitored device;
   representing the security-relevant information in a model specific to the monitored device in real-time as the security-relevant information is received, wherein a system component or an event associated with the security-relevant information received from the monitored device is represented in the model by at least two data objects including a first data object with a device-specific scope and a second data object with a group-specific scope or a global scope, and wherein the device-specific scope, the group-specific scope, and the global scope differ in scope;
   propagating a property from the first data object to the second data object;
   detecting, in real-time as the security-relevant information is represented, a security concern associated with the security-relevant information represented in the model; and
   in response to detecting the security concern:
      selecting an action among a plurality of different actions based at least in part on the propagating of the property from the first data object to the second data object; and
      taking the action, in real-time as the security concern is detected.

14. The method of claim 13, further comprising gathering further information from another model representing additional security-relevant information received from a plurality of monitored devices or from one or more other sources responsive to detecting the security concern.

15. The method of claim 14, wherein the one or more other sources include other device-specific models.

16. The method of claim 13, wherein the model specific to the monitored device is associated with an actor module that is responsible for maintaining the model specific to the monitored device.

17. The method of claim 13, wherein taking the action comprises at least one of updating a configuration of an agent of the monitored device, triggering an action on the monitored device, or updating runtime data in the monitored device.

18. The method of claim 13, wherein the detecting comprises detecting different security concerns by different modules of the security service cloud, the different modules each configured to detect one or more different security concerns.

19. One or more non-transitory computer-readable media having stored thereon a plurality of programming instructions which, when executed by one or more computing devices, cause the one or more computing devices to perform actions comprising:
   receiving security-relevant information associated with system components and events of a plurality of monitored devices;
   in real-time as the security-relevant information is received, updating a graph model representing the system components and events of the plurality of monitored devices as data objects, wherein a system component or an event associated with the security-relevant information received from the plurality of monitored devices is represented in the graph model by at least two data objects including a first data object with a device-specific scope and a second data object with a group-specific scope or a global scope, and wherein the device-specific scope, the group-specific scope, and the global scope differ in scope;
   propagating a property from the first data object to the second data object; and
   in real-time as the system components and events are represented,
      detecting a security concern associated with the represented system components and events, and
      in response to detecting the security concern:
         selecting an action among a plurality of different actions based at least in part on the propagating of the property from the first data object to the second data object; and
         taking the action, in real-time as the security concern is detected.

20. The one or more non-transitory computer-readable media of claim 19, wherein the actions further comprise creating a search index for finding security relevant information without having to traverse the graph model.

21. The one or more non-transitory computer-readable media of claim 19, wherein the actions further comprise receiving a notification of the update to the graph model through a message queue.

22. The one or more non-transitory computer-readable media of claim 19, wherein the actions further comprise performing additional analysis in response to detecting the security concern.

23. The one or more non-transitory computer-readable media of claim 19, wherein the actions further comprise storing additional data relevant to the data objects but which is not represented in the graph model.

24. The one or more non-transitory computer-readable media of claim 20, wherein the data objects represent processes, modules of processes, execution chains of processes, event detections, or pattern hits.

* * * * *